(12) United States Patent
Crowder et al.

(10) Patent No.: US 9,849,399 B2
(45) Date of Patent: Dec. 26, 2017

(54) BACKGROUND IMAGERY FOR ENHANCED PEPPER'S GHOST ILLUSION

(71) Applicant: VENTANA 3D, LLC, Santa Monica, CA (US)

(72) Inventors: Ashley Crowder, Venice, CA (US); Benjamin Conway, Santa Monica, CA (US); Troy P. Senkiewicz, Toluca Lake, CA (US)

(73) Assignee: VENTANA 3D, LLC, Van Nuys, CA (US)

( * ) Notice: Subject to any disclaimer, the term of this patent is extended or adjusted under 35 U.S.C. 154(b) by 0 days.

(21) Appl. No.: 14/939,772

(22) Filed: Nov. 12, 2015

(65) Prior Publication Data

US 2016/0129365 A1    May 12, 2016

Related U.S. Application Data

(60) Provisional application No. 62/078,503, filed on Nov. 12, 2014, provisional application No. 62/132,136, filed on Mar. 12, 2015.

(51) Int. Cl.
| | | |
|---|---|---|
| *A63J 5/02* | (2006.01) |
| *G02B 27/22* | (2006.01) |
| *G03B 21/62* | (2014.01) |
| *G02B 27/00* | (2006.01) |
| *G03B 21/28* | (2006.01) |

(52) U.S. Cl.
CPC ............... *A63J 5/02* (2013.01); *A63J 5/021* (2013.01); *G02B 27/2292* (2013.01); *G03B 21/62* (2013.01); *G03B 21/28* (2013.01)

(58) Field of Classification Search
CPC .. A63G 31/00; A63G 31/16; A63J 5/00; A63J 5/021; A63J 5/12; A63J 21/00; A63J 25/00; G02B 27/00; G02B 27/2235; G02B 27/2292
USPC ................... 472/59–61, 130; 352/10, 28, 43
See application file for complete search history.

(56) References Cited

U.S. PATENT DOCUMENTS

| | | | | |
|---|---|---|---|---|
| 5,026,152 A * | 6/1991 | Sharkey | ............... | A63J 25/00 352/43 |
| 5,685,625 A * | 11/1997 | Beaver | ............... | A63J 5/021 353/28 |
| 5,865,519 A * | 2/1999 | Maass | ............... | A63J 5/021 353/28 |
| 7,883,212 B2 * | 2/2011 | O'Connell | ............... | A63J 25/00 353/10 |
| 8,692,738 B2 * | 4/2014 | Smithwick | ......... | G02B 27/2214 345/4 |

* cited by examiner

*Primary Examiner* — Kien Nguyen
(74) *Attorney, Agent, or Firm* — Parker Ibrahim & Berg LLC; James M. Behmke; Stephen D. LeBarron

(57) ABSTRACT

Systems and methods herein are directed to providing a visual effect background that may be added behind a transparent holographic projection screen (e.g., of a Pepper's Ghost Illusion system) that provides for greater scenic depth behind the holographic projection, regardless of the amount of actual physical space behind the transparent screen. The background, which may be used for projection-based holographic projections or video panel display projections, generally establishes an optical illusion of depth behind the holographic images (producing a depth perception or "perspective" that gives a greater appearance of depth or distance behind a holographic projection).

20 Claims, 15 Drawing Sheets

BACKGROUND IMAGERY FOR ENHANCED PEPPER'S GHOST ILLUSION

RELATED APPLICATIONS

The present application claims priority to U.S. Provisional Patent Application Ser. No. 62/078,503, entitled "HOLOGRAPHIC PROJECTION SYSTEM AND ENHANCED PEPPER'S GHOST ILLUSION", filed on Nov. 12, 2014 by Crowder et al., the entire contents of which being incorporated by reference in its entirety.

The present application also claims priority to U.S. Provisional Patent Application Ser. No. 62/132,136, entitled "BACKGROUND IMAGERY FOR ENHANCED PEPPER'S GHOST ILLUSION", filed on Mar. 12, 2015 by Crowder et al., the entire contents of which being incorporated by reference in its entirety.

TECHNICAL FIELD

The present disclosure relates generally to holographic projection, and, more particularly, to background imagery for an enhanced Pepper's Ghost Illusion.

BACKGROUND

The "Pepper's Ghost Illusion" is an illusion technique known for centuries (named after John Henry Pepper, who popularized the effect), and has historically been used in theatre, haunted houses, dark rides, and magic tricks. It uses plate glass, Plexiglas, or plastic film and special lighting techniques to make objects seem to appear or disappear, become transparent, or to make one object morph into another. Traditionally, for the illusion to work, the viewer must be able to see into a main room, but not into a hidden room. The hidden room may be painted black with only light-colored objects in it. When light is cast on the room, only the light objects reflect the light and appear as ghostly translucent images superimposed in the visible room.

Notably, Pepper's Ghost Illusion systems have generally remained the same since the 19th Century, adding little more over time than the use of projection systems that either direct or reflect light beams onto the transparent angled screen, rather than using live actors in a hidden room. That is, technologies have emerged in the field of holographic projection that essentially mimic the Pepper's Ghost Illusion, using projectors as the light source to send a picture of an object or person with an all-black background onto a flat, high-gain reflection surface (also referred to as a "bounce"), such as white or grey projection screen. The bounce is typically maintained at an approximate 45-degree angle to the transparent screen surface.

For example, a recent trend in live music performances has been to use a holographic projection of a performer (e.g., live-streamed, pre-recorded, or re-constructed). FIG. 1 illustrates an example of a conventional (generally large-scale) holographic projection system 100. Particularly, the streamed (or recorded, or generated) image of the artist (or other object) may be projected onto a reflective surface, such that it appears on an angled screen and the audience sees the artist or object and not the screen. If the screen is transparent, this allows for other objects, such as other live artists, to stand in the background of the screen, and to appear to be standing next to the holographic projection when viewed from the audience.

Still, despite its historic roots, holographic projection technology is an emerging field, particularly with regards to various aspects of enhancing the illusion and/or managing the setup of the system. For instance, holographic projection systems, in general, often require a fair amount of depth behind the transparent screen in order to properly create the illusion of realism in the holographic projection.

SUMMARY

According to one or more embodiments herein, systems and methods are directed to providing a visual effect background that may be added behind a transparent holographic projection screen (e.g., of a Pepper's Ghost Illusion system) that provides for greater scenic depth behind the holographic projection, regardless of the amount of actual physical space behind the transparent screen. The background, which may be used for projection-based holographic projections or video panel display projections, generally establishes an optical illusion of depth behind the holographic images (producing a depth perception or "perspective" that gives a greater appearance of depth or distance behind a holographic projection).

Other specific embodiments, extensions, or implementation details are also described below.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Figure 1:
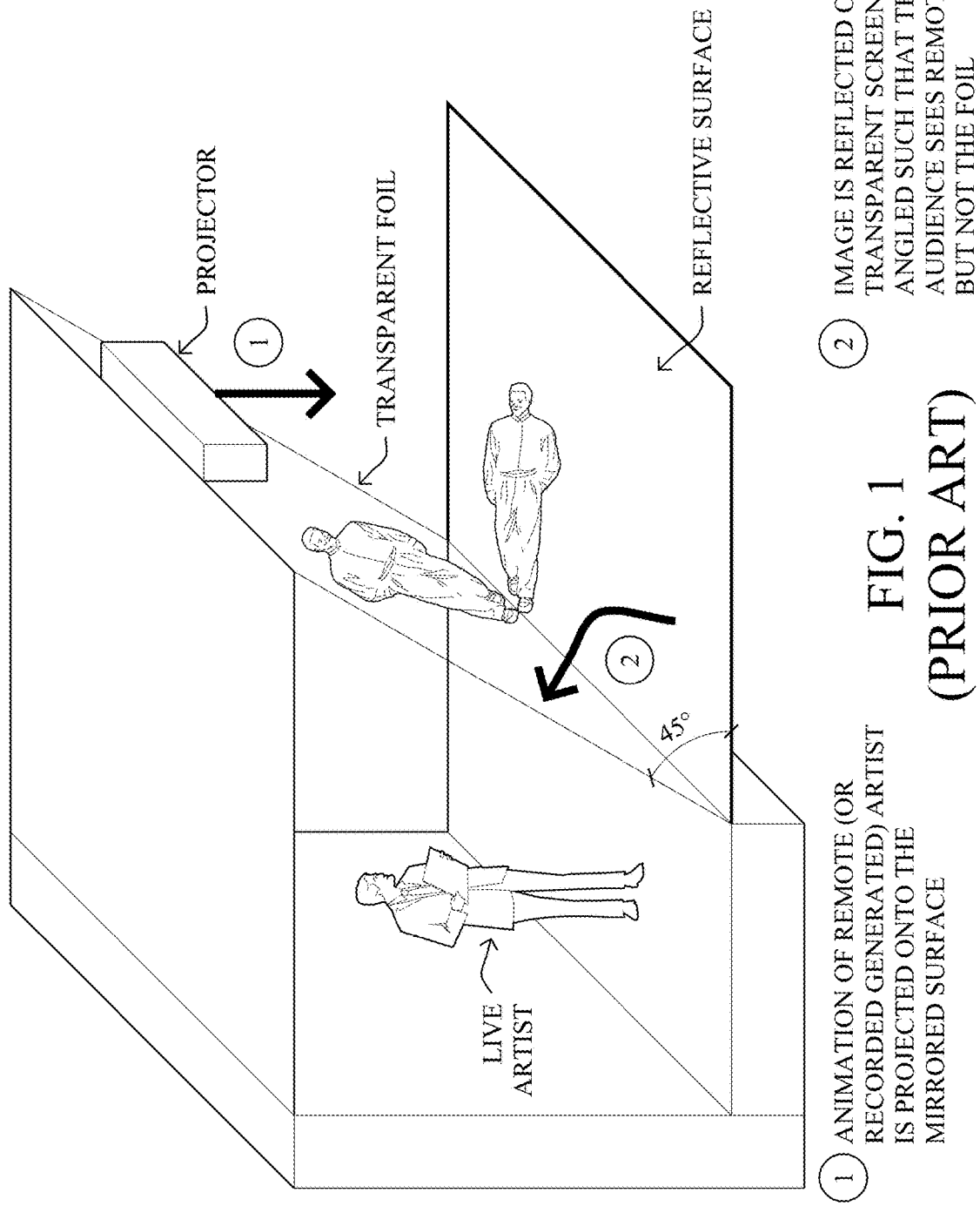
FIG. 1 illustrates an example of well-known holographic projection techniques.

As noted above, the "Pepper's Ghost Illusion" is an illusion technique that uses plate glass, Plexiglas, or plastic film and special lighting techniques to make holographic projections of people or objects. FIG. 1, in particular, illustrates an example of holographic projection using projectors as the light source to send a picture of an object or person with an all-black background onto a flat, high-gain reflection surface (or "bounce"), such as white or grey projection screen. The bounce is typically maintained at an approximate 45-degree angle to the transparent screen surface.

Figure 2:
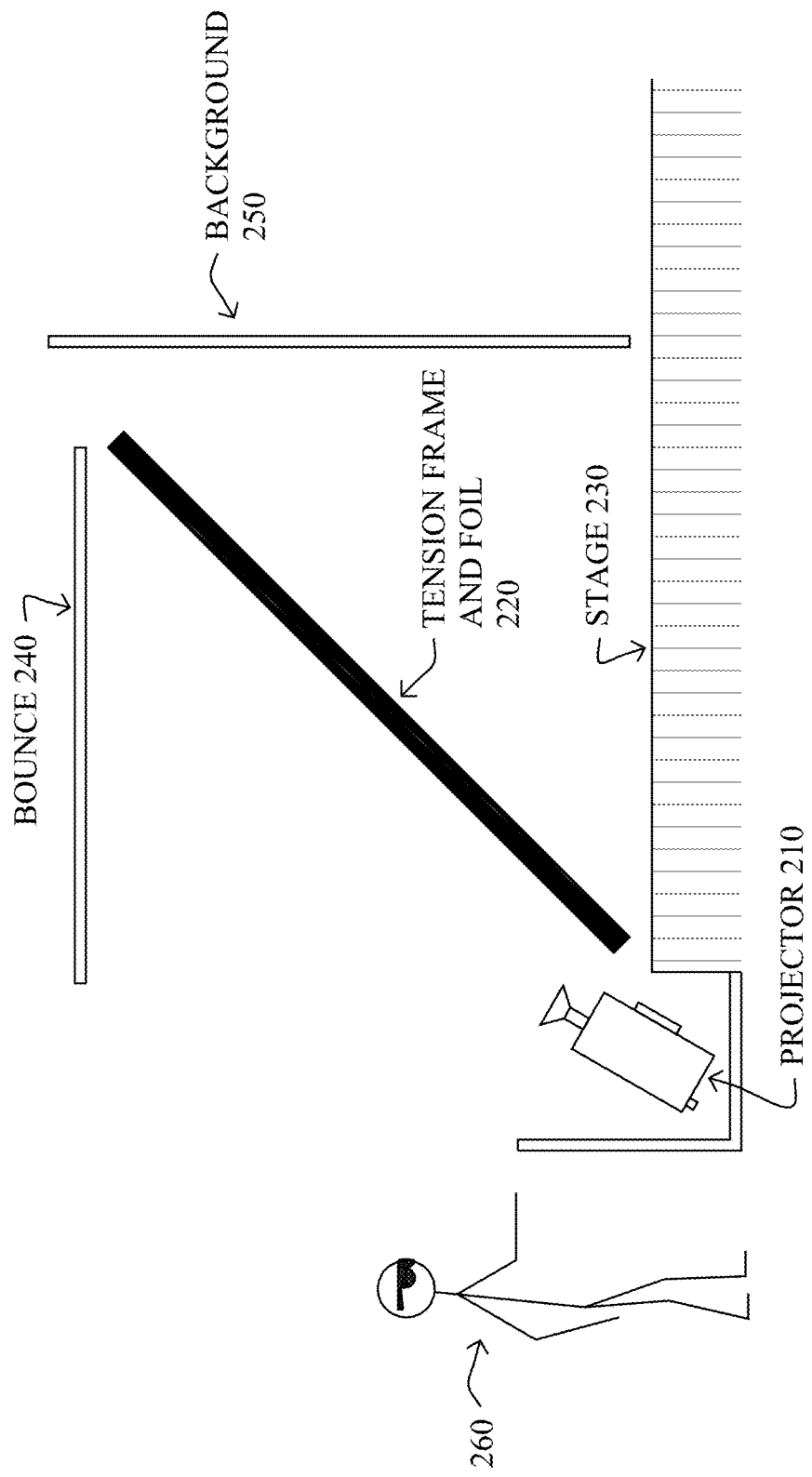
FIG. 2 illustrates an alternative arrangement for a projection-based holographic projection system, namely where the projector is located on the floor, and the bounce is located on the ceiling.

FIG. 2 illustrates an alternative arrangement for a projection-based holographic projection system, namely where the projector 210 is located on the floor, and the bounce 240 is located on the ceiling. The stick figure illustrates the viewer 260, that is, from which side one can see the holographic projection. In this arrangement, the same effect can be achieved as in FIG. 1, though there are various considerations as to whether to use a particular location of the projector 210 as in FIG. 1 or FIG. 2.

Though the projection-based system is suitable in many situations, particularly large-scale uses, there are certain issues with using projectors in this manner. For example, if atmosphere (e.g., smoke from a fog machine) is released, the viewer 260 can see where the light is coming from, thus ruining the effect. Also, projectors are not typically bright enough to shine through atmosphere, which causes the reflected image to look dull and ghost-like. Moreover, projectors are large and heavy which leads to increased space requirements and difficulty rigging.

Figure 3:
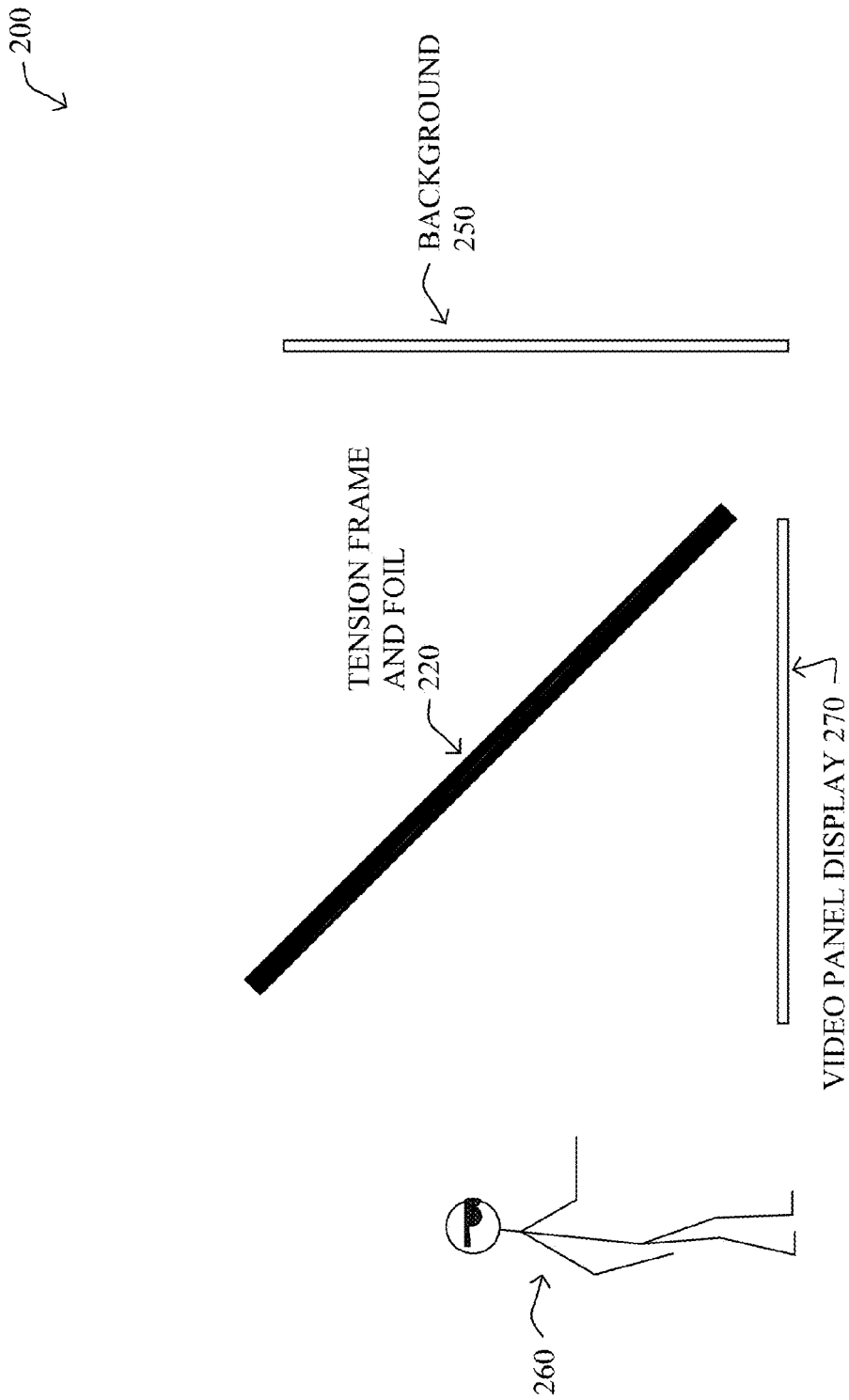
FIG. 3 illustrates an example of a holographic projection system using video panel displays, with the panel below a transparent screen.
Figure 4:
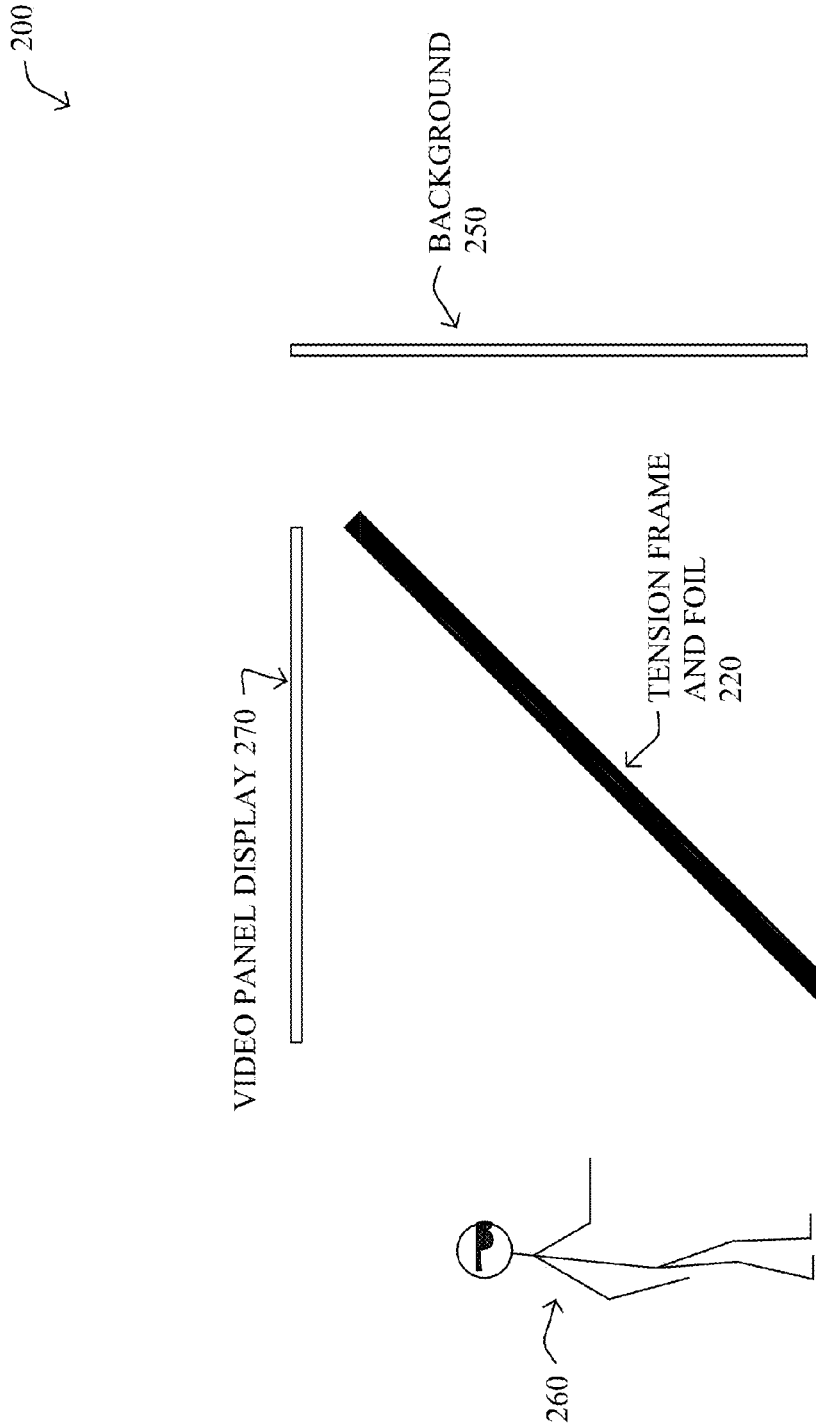
FIG. 4 illustrates an example of a holographic projection system using video panel displays, with the panel above a transparent screen.

Another example holographic projection system, therefore, with reference generally to FIGS. 3 and 4, may be established with video panel displays 270, such as LED or LCD panels, mobile phones, tablets, laptops, or monitors as the light source, rather than a projection-based system. In particular, these panel-based systems allow for holographic projection for any size setup, such as from personal "mini" displays (e.g., phones, tablets, etc.) up to the larger full-stage-size displays (e.g., with custom-sized LCD or LED panels). Similar to the typical arrangement, a preferred angle between the image light source and the reflective yet transparent surface (clear screen) is an approximate 45-degree angle, whether the display is placed below the transparent screen (FIG. 3) or above it (FIG. 4).

Again, the stick figure illustrates the viewer 260, that is, from which side one can see the holographic projection. Note that the system typically provides about 165-degrees of viewing angle. (Also note that various dressings and props can be designed to hide various hardware components and/or to build an overall scene, but such items are omitted for clarity.)

The transparent screen is generally a flat surface that has similar light properties of clear glass (e.g., glass, plastic such as Plexiglas or tensioned plastic film). As shown, a tensioning frame 220 is used to stretch a clear foil into a stable, wrinkle-free (e.g., and vibration resistant) reflectively transparent surface (that is, displaying/reflecting light images for the holographic projection, but allowing the viewer to see through to the background 250). Generally, for larger displays it may be easier to use a tensioned plastic film as the reflection surface because glass or rigid plastic (e.g., Plexiglas) is difficult to transport and rig safely.

The light source itself can be any suitable video display panel, such as a plasma screen, an LED wall, an LCD screen, a monitor, a TV, a tablet, a mobile phone, etc. A variety of sizes can be used. When an image (e.g., stationary or moving) is shown on the video panel display 270, such as a person or object within an otherwise black (or other stable dark color) background, that image is then reflected onto the transparent screen (e.g., tensioned foil or otherwise), appearing to the viewer (shown as the stick figure) in a manner according to Pepper's Ghost Illusion. However, different from the original Pepper's Ghost Illusions using live actors/objects, and different from projector-based holographic systems, the use of video panel displays reduces or eliminates the "light beam" effect through atmosphere (e.g., fog), allowing for a clearer and un-tainted visual effect of the holographic projection. (Note that various diffusion layers may be used to reduce visual effects created by using video panel displays, such as the Moiré effect.) Also, using a video panel display 270 may help hide projector apparatus, and may reduce the overall size of the holographic system.

Additionally, some video panels such as LED walls are able to generate a much brighter image than projectors are able to generate thus allowing the Pepper's Ghost Illusion to remain effective even in bright lighting conditions (which generally degrade the image quality). The brighter image generated from an LED wall also allows for objects behind the foil to be more well lit than they can be when using projection.

In addition, by displaying an image of an object or person with a black background on the light source, it is reflected onto the transparent flat surface so it looks like the object or person is floating or standing on its own. In accordance with typical Pepper's Ghost Illusion techniques, a stage or background can be put behind and/or in front of the transparent film so it looks like the object or person is standing on the stage, and other objects or even people can also be on either side of the transparent film.

In general, holographic projections may be used for a variety of reasons, such as entertainment, demonstration, retail, advertising, visualization, video special effects, and so on. The holographic images may be produced by computers that are local to the projectors or video panels, or else may be generated remotely and streamed or otherwise forwarded to local computers.

As an example, by streaming the video image of the performer as a video and projecting it onto a holographic projection system, a true concert or nightclub experience can be transmitted across the globe for the live entertainment experience. For instance, holographically live-streaming concerts to satellite venues around the globe while maintaining the live concert experience helps artists reach new markets and new revenue streams, while bringing live sets to more fans all across the world. Satellite venues can be configured to have the same concert feel as an actual show: intense lighting effects, great sound quality, bars, merchandise, etc. The only difference is that the performers are not physically present, but are holographically projected from the broadcast venue. The music is streamed directly from the soundboard of the broadcast venue and sent to state-of-the-art sound systems at the satellite venues. Light shows may accompany the performance with top of the line LED screens and lasers.

Figure 5:
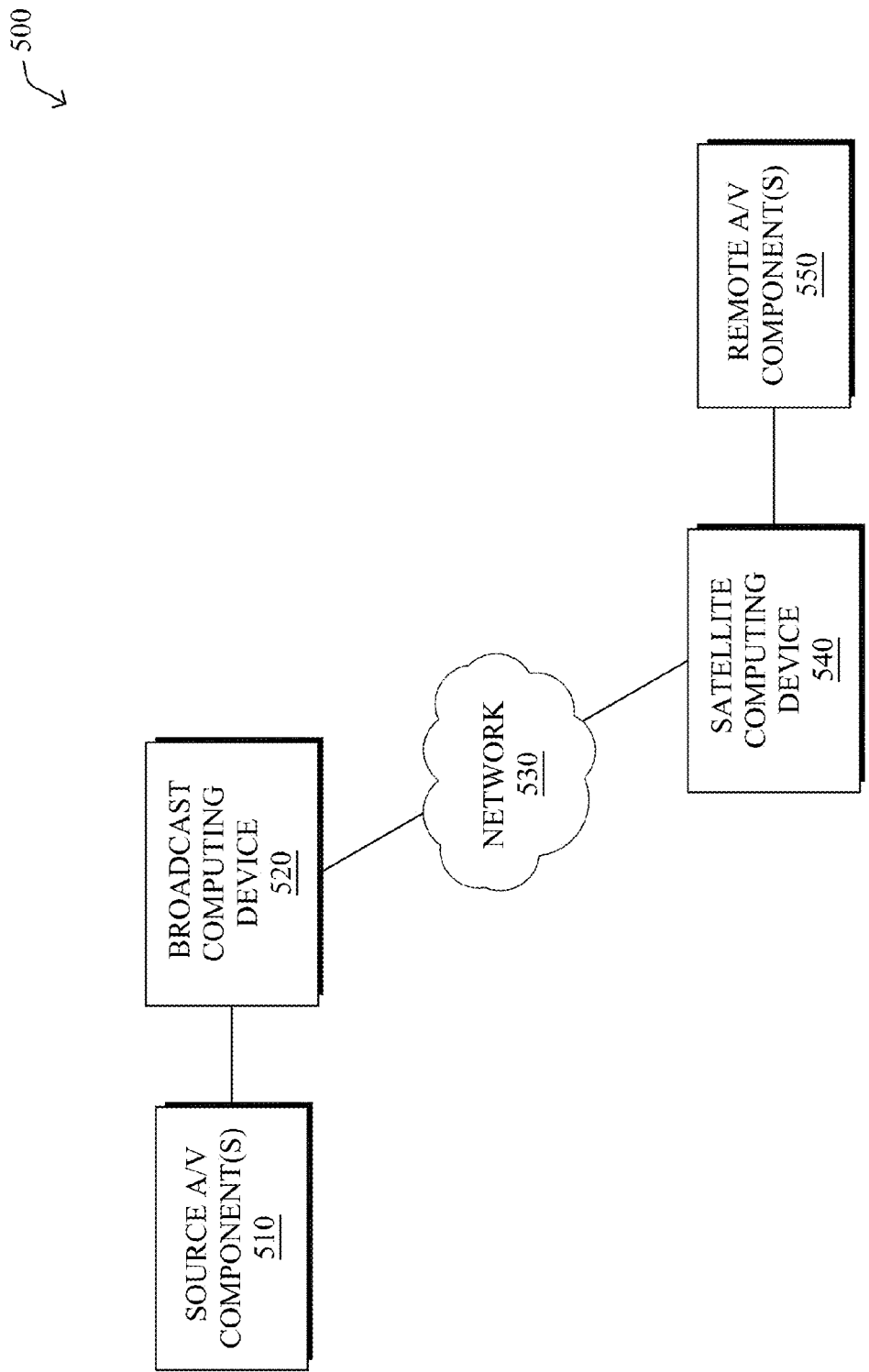
FIG. 5 illustrates an example simplified holographic projection system (e.g., communication network)

For instance, FIG. 5 illustrates an example simplified holographic projection system (e.g., communication network), where the network 500 comprises one or more source A/V components 510, one or more "broadcast" computing devices 520 (e.g., a local computing device), a communication network 530 (e.g., the public Internet or other communication medium, such as private networks), one or more "satellite" computing devices 540 (e.g., a remote computing device), and one or more remote A/V components 550.

In the example above, a broadcast venue may comprise the source A/V components 510, such as where a performance artist is performing (e.g., where a disc jockey (DJ) is spinning) in person. The techniques herein may then be used to stream (relay, transmit, re-broadcast, etc.) the audio and video from this broadcast location to a satellite venue, where the remote A/V components 550 are located. For instance, the DJ in the broadcast location may have the associated audio, video, and even corresponding electronic effects (lights, pyrotechnics, etc.) streamed directly to the satellite venue's A/V system with the same high quality sound as if the musician/artist was playing/singing in person.

As another example, in computing, an "avatar" is the graphical representation of the user (or the user's alter ego or other character). Avatars may generally take either a two-dimensional (2D) form or three-dimensional (3D) form, and typically have been used as animated characters in computer games or other virtual worlds (e.g., in addition to merely static images representing a user in an Internet forum). To control an avatar or other computer-animated model (where, notably, the term "avatar" is used herein to represent humanoid and non-humanoid computer-animated objects that may be controlled by a user), a user input system converts user action into avatar movement.

Figure 6:
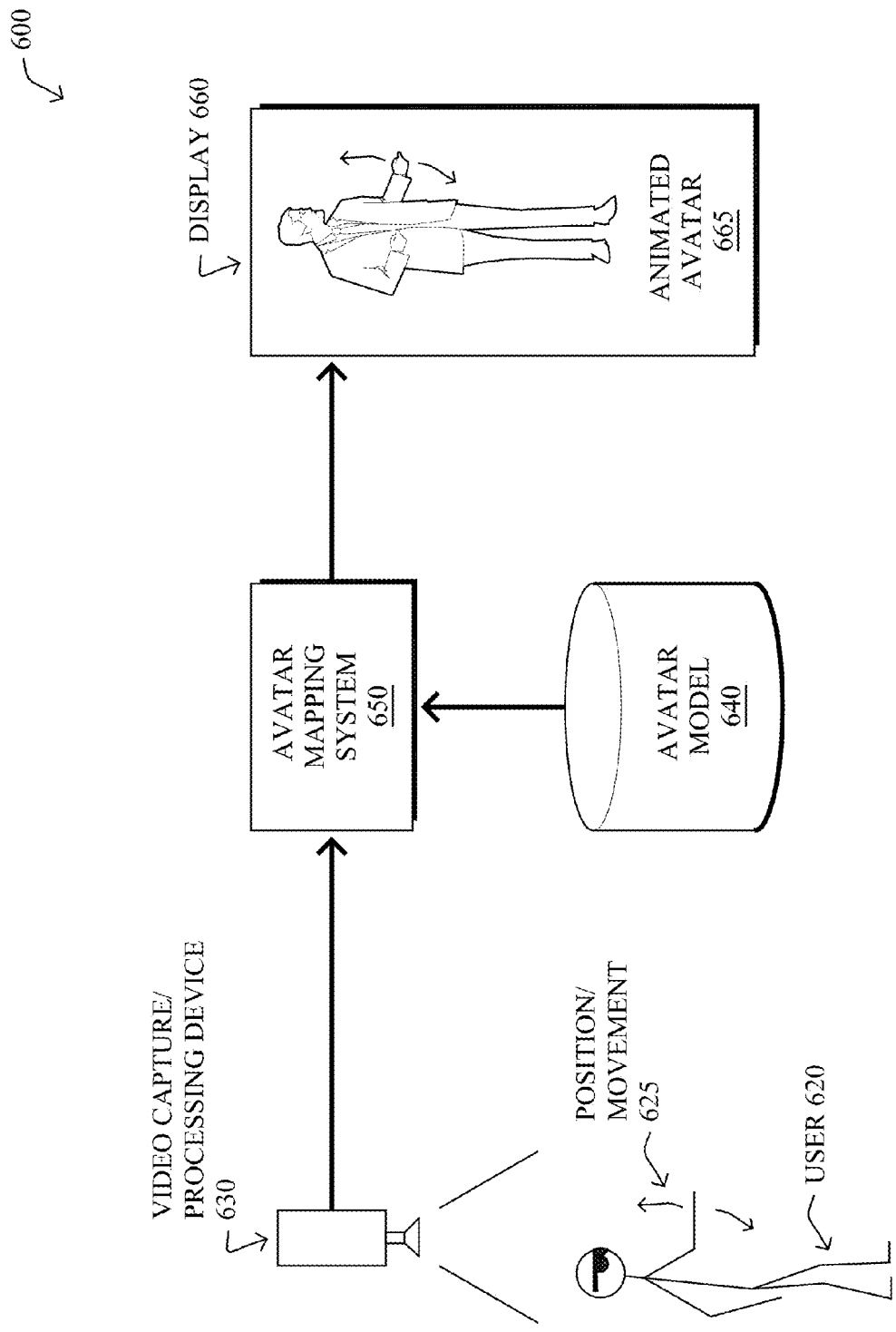
FIG. 6 illustrates a simplified example of an avatar control system.

FIG. 6 illustrates a simplified example of an avatar control system. In particular, as shown in the system 600, a video capture/processing device 610 is configured to capture video images of one or more objects, particularly including one or more users 620 that may have an associated position and/or movement 625. The captured video data may comprise color information, position/location information (e.g., depth information), which can be processed by various body tracking and/or skeletal tracking algorithms to detect the locations of various tracking points (e.g., bones, joints, etc.) of the user 620. An avatar mapping system 650 may be populated with an avatar model 640, such that through various mapping algorithms, the avatar mapping system is able to animate an avatar 665 on a display 660 as controlled by the user 620. Illustratively, in accordance with the techniques herein the display 660 may comprise a holographic projection of the model animated avatar 665, e.g., allowing an individual to interactively control a holographic projection of a character. (Notably, the avatar mapping system 650 may provide its control functionality in real-time or as a recorded/post-production video feed, and may be co-located with the video processing system 630, remotely located from the video processing system, or as divided components allowing it to be both local to and remote from the video processing system.)

Background Imagery for Enhanced Pepper's Ghost Illusion

Notably, by displaying an image of an object or person with a black background on the light source, it is reflected onto the transparent flat surface so it looks like the object or person is floating or standing on its own. In accordance with typical Pepper's Ghost Illusion techniques, a stage or background can be put behind and/or in front of the transparent film so it looks like the object or person is standing on the stage, and other objects or even people can also be on either side of the transparent film. A major constraint in setting up a Pepper's Ghost display, however, is the large space requirement. In order to display a realistic holographic projection, a large amount of depth is typically needed behind the transparent screen.

In other words, the appearance of depth behind the transparent screen is very important to the overall holographic projection effect. In order to reduce the overall size of the system, one or more particular embodiments of the techniques herein provide for an optical illusion behind the transparent screen in order to create the illusion of depth behind the screen.

Figure 7:
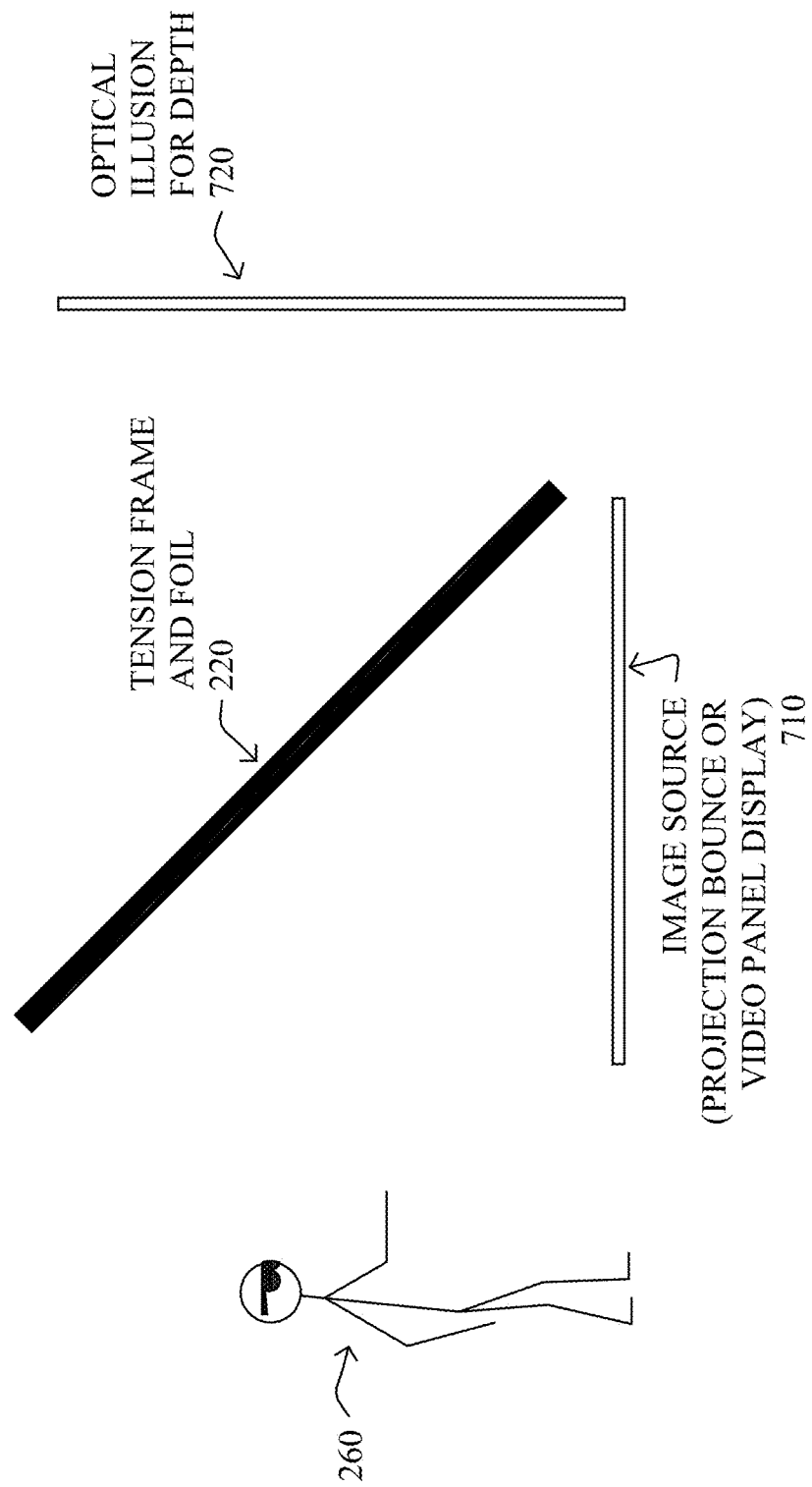
FIGS. 7-8 illustrate examples of holographic projection systems with an optical illusion background for depth perspective in accordance with one or more embodiments described herein.
Figure 8:
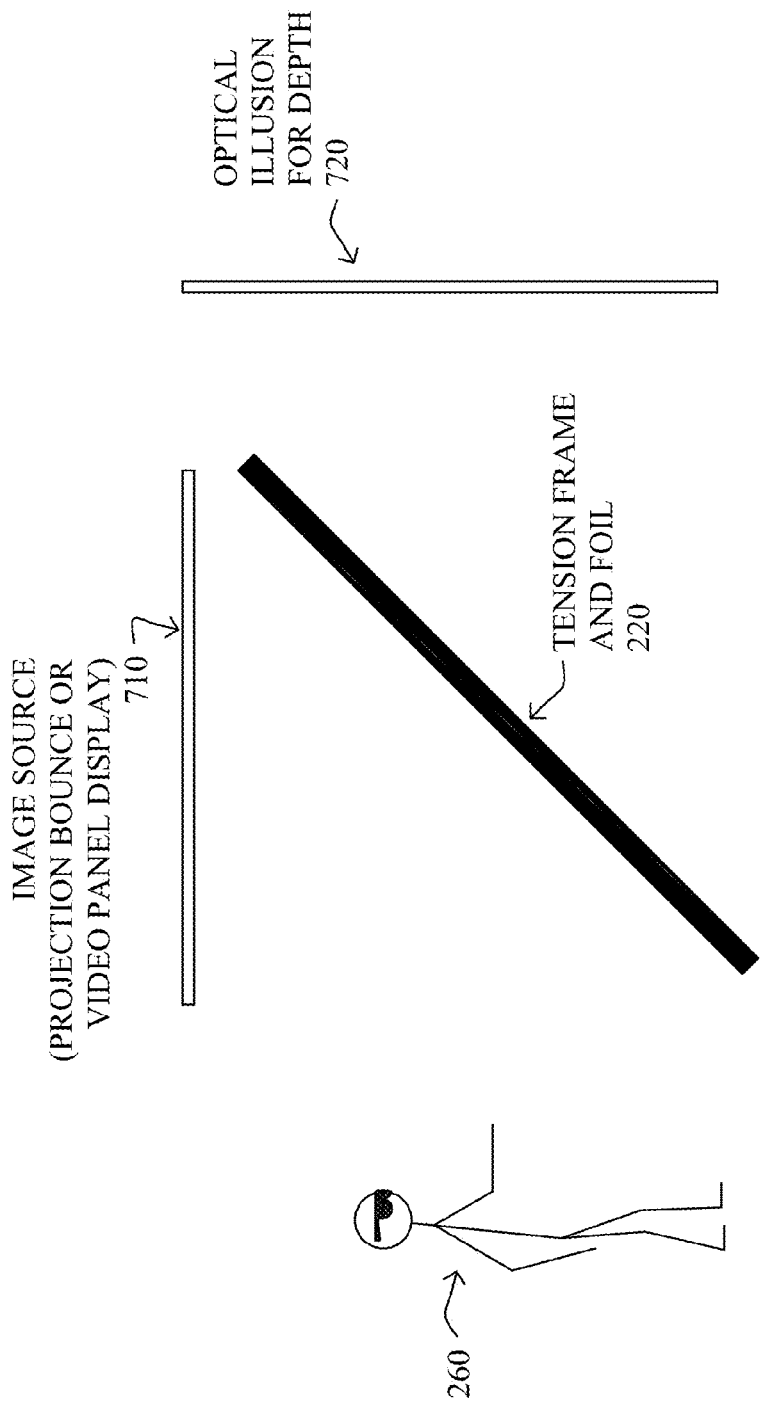

In particular, though a larger stage setup might not require the use such an illusion, smaller venues or small displays may have a limited footprint for setting up the holographic projection system, and thus, as shown in FIGS. 7-8, an optical illusion background for depth 720 may be used in closer proximity to the transparent screen/foil 220. Notably, the illusion-inducing backdrop can be a physical stationary backdrop (e.g., picture, painting, etc.), or else may be a projection or light wall such as an LCD or LED wall. Also, the optical illusion image displayed may be stationary (a single image) or dynamic, may change images (e.g., a slide-show of images), or else may include motion or movement (e.g., a filmed sequence, a moving geometric pattern, etc.). In other words, the optical illusion background may be a static optical illusion image, a panel display configured to display an optical illusion image, a projection screen configured to display an optical illusion image, or even a projection mapping of an optical illusion image projected directly onto a background environment (that is, not a projection bounce behind the reflective screen, but directly onto whatever objects are located behind the reflective screen).

Figure 9:
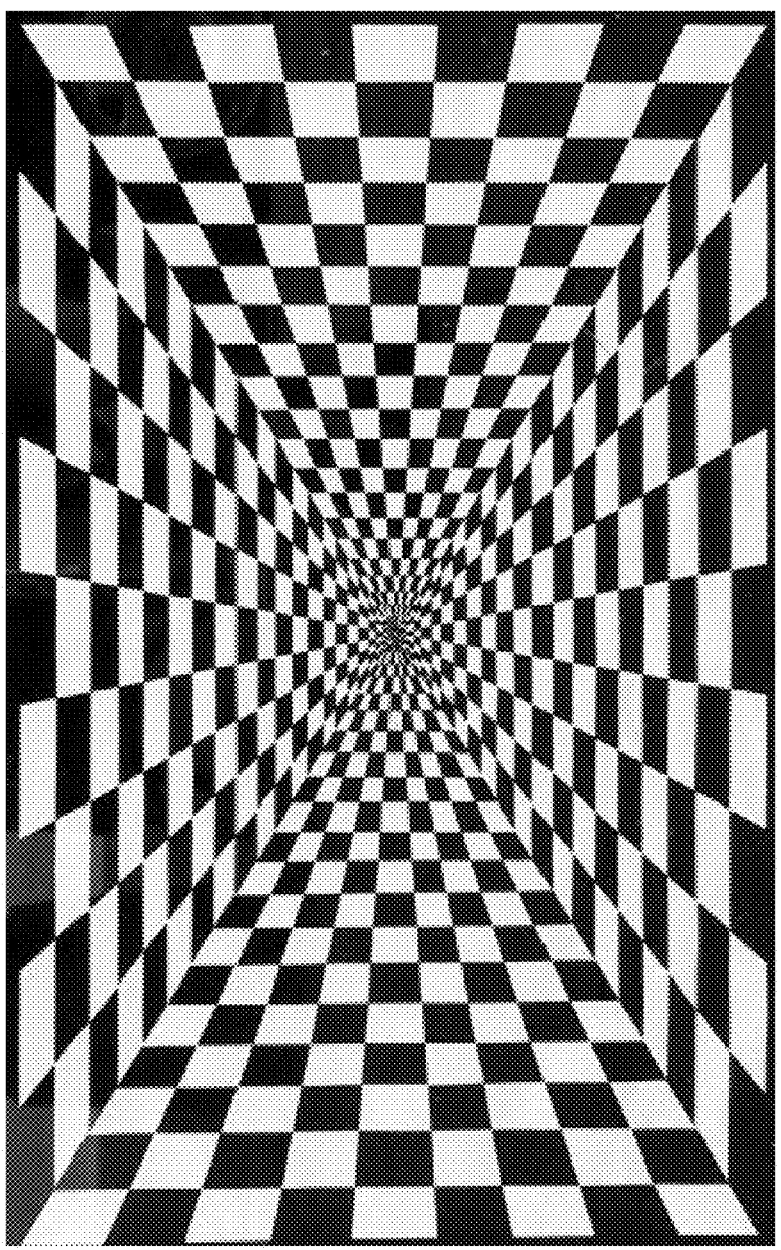
FIGS. 9-11 illustrate example visual depth illusion backgrounds in accordance with one or more embodiments described herein.
Figure 10:
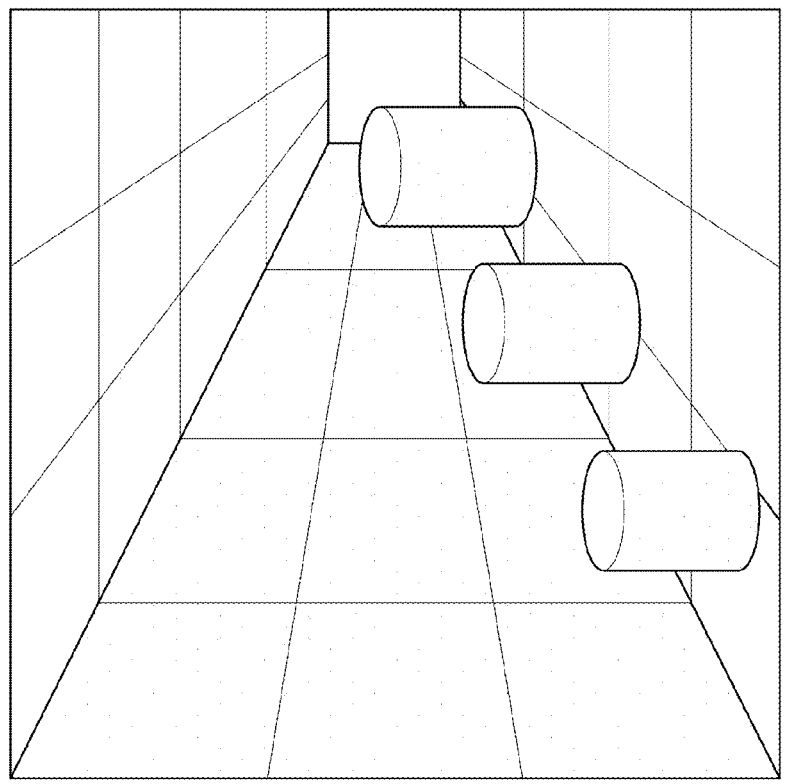
Figure 11:

Example optical illusion backgrounds 900-1100 are shown in FIGS. 9-11, and may include patterns, geometric shapes, scenery, etc., arranged in such a manner as to produce a depth perception (e.g., "perspective") that gives a greater appearance of depth or distance behind a holographic projection created using the Pepper's Ghost Illusion, particularly with video panel displays 270 as described above.

Figure 12:
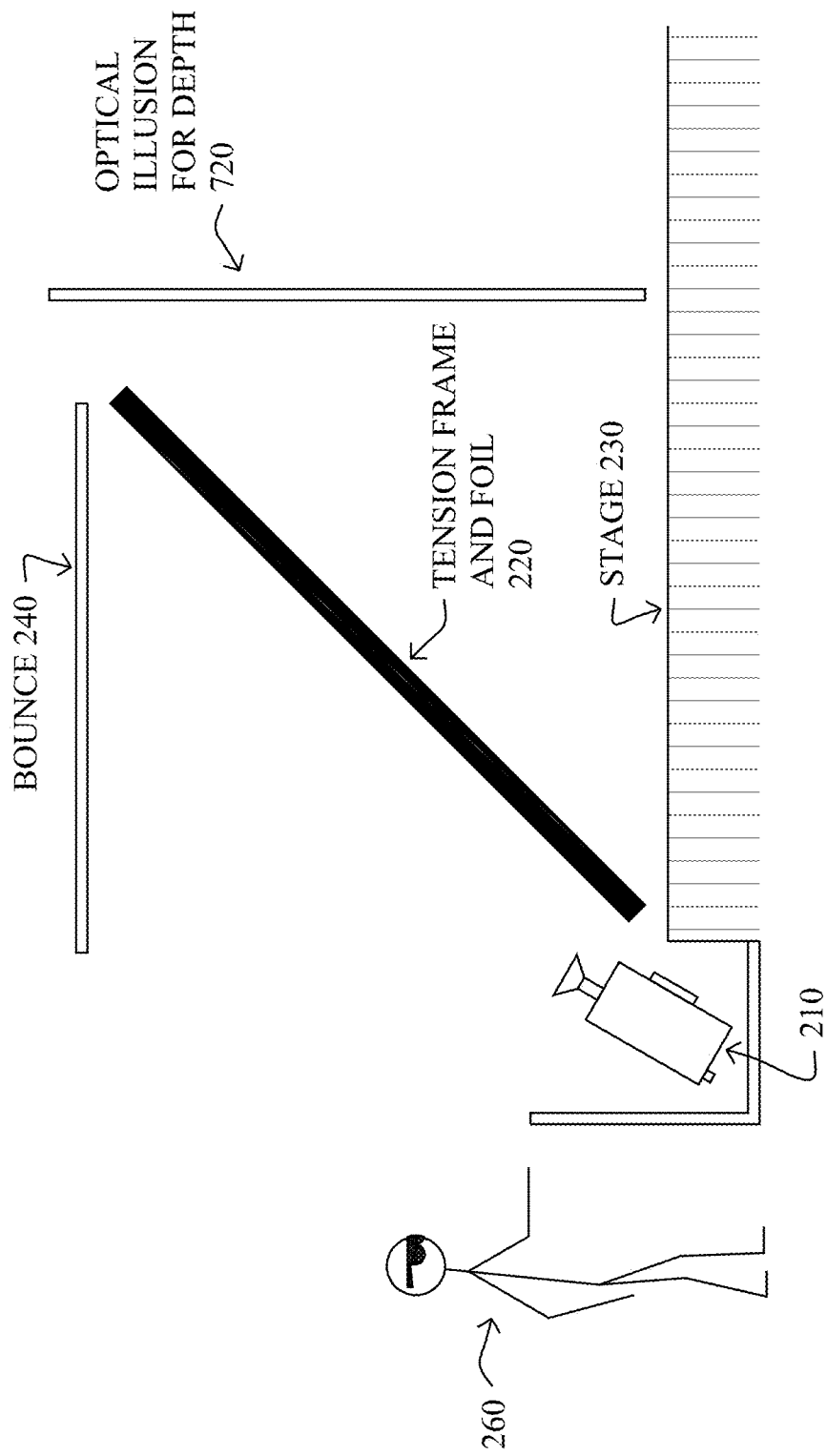
FIGS. 12-14 illustrate examples of alternative embodiments using the visual depth illusion background with projection techniques in accordance with one or more embodiments described herein.
Figure 13:
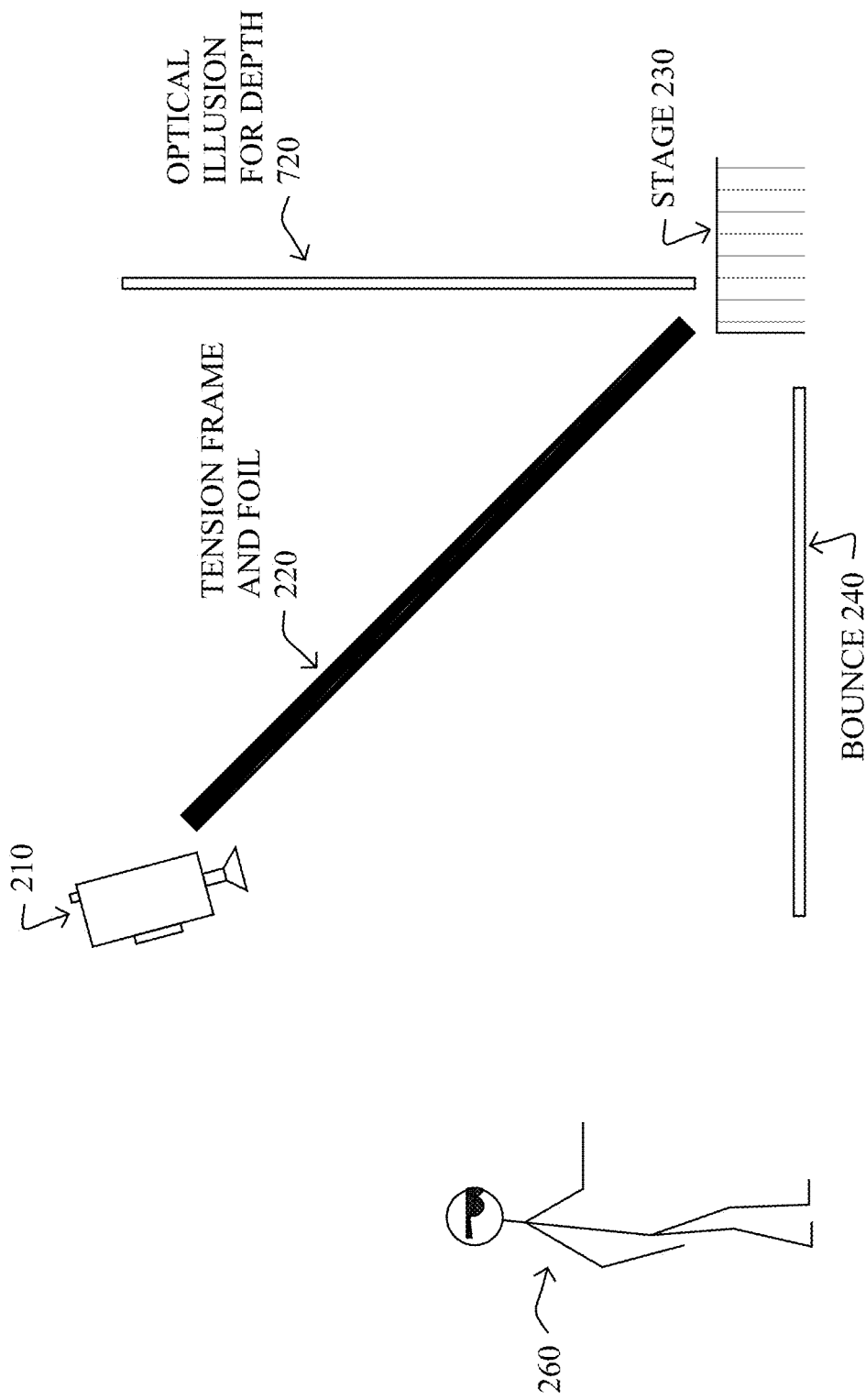
Figure 14:
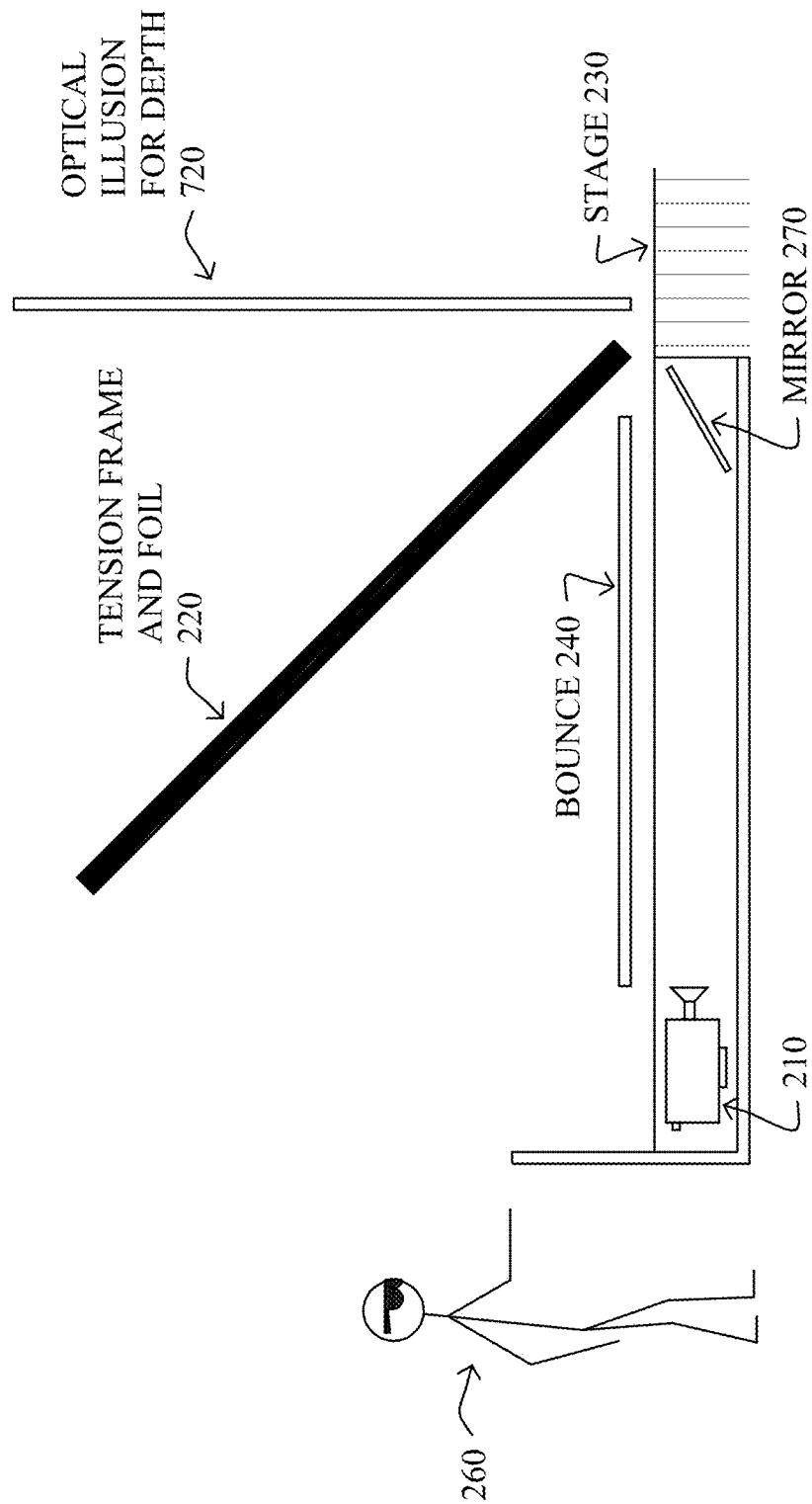

FIGS. 12-14 illustrate examples of alternative embodiments to using a video panel display 270 as shown above, but that may still advantageously make use of the visual depth illusion backgrounds 720. In particular, as shown in FIG. 12, the light source needed to project the desired image can be a projector 210 that is placed opposite to a high gain reflection surface or "bounce" 240, such as placing the projector 210 near the floor, and placing the bounce 240 at the ceiling. The bounce 240 then displays the image, and it is reflected/shown on the transparent screen (foil) 220 with the optical illusion 720 behind the holographic projection. Another variation is to place the projector 210 at the end of the transparent screen, e.g., attached to the frame of the screen 220 (or else to the ceiling or a truss above the frame), and to bounce the image off the floor, as shown in FIG. 13. Furthermore, in FIG. 14, other various arrangements using projectors can be imagined, such as using a mirror 280 to reflect the image from a projector 210 onto the bottom of the bounce 240 (e.g., "rear projection", as will be appreciated by those skilled in the art). Any of these shown projection techniques, as well as other projection techniques, may thus benefit from use of the optical illusion background in order to reduce the overall size of the system set-up.

Figure 15:
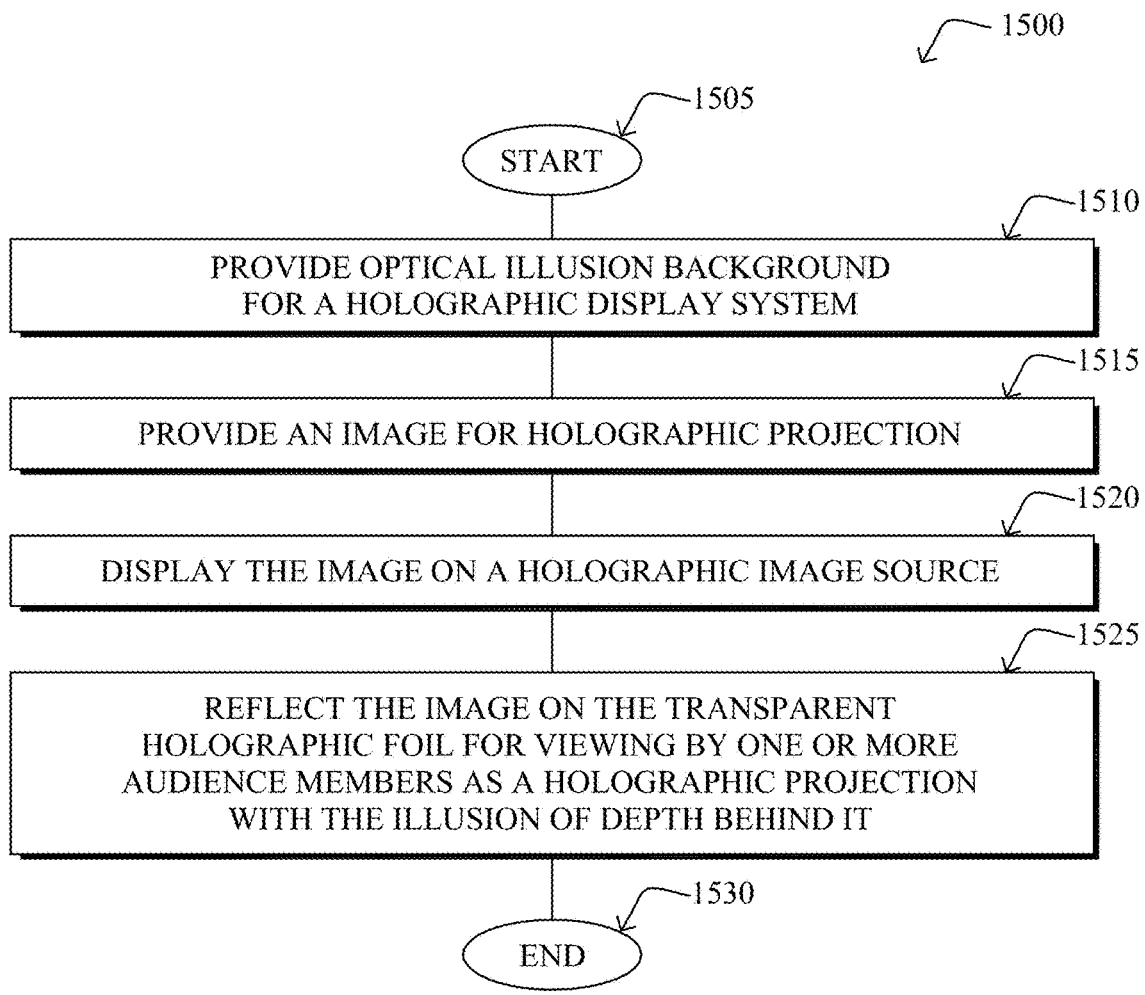
FIG. 15 illustrates an example simplified procedure for using background imagery for an enhanced Pepper's Ghost Illusion in accordance with one or more embodiments described herein.

FIG. 15 illustrates an example simplified procedure for using background imagery for an enhanced Pepper's Ghost Illusion in accordance with one or more embodiments described herein. The simplified procedure 1500 may start at step 1505, and continues to step 1510, where an optical illusion background is provided for a holographic display system (e.g., projection or display panel based). In step 1515, an image is provided for holographic projection, which may be displayed on an image source in step 1520, and is then reflected in step 1525 on the transparent holographic foil for viewing by one or more audience members as a holographic projection. The simplified procedure ends in step 1530.

It should be noted that while certain steps within procedure 1500 may be optional as described above, the steps shown in FIG. 15 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Advantageously, the techniques herein provide for holographic projection techniques that allow for reduced system size, greater system versatility, and greater user experience. In particular, the use of a visual depth illusion background, for video panel display or projection-based systems, reduces the physical depth required behind the angled transparent screen in order to create the visual effect of depth behind the reflected holographic projection.

The embodiments described herein provide for holographic projection using video panels and also enhanced Pepper's Ghost Illusion techniques (e.g., added depth perception). Notably, the embodiments described herein may be used with holographic projection images produced from a variety of sources, such as live-streamed, pre-recorded, re-constructed, computer-generated, and so on. For example, as described in commonly owned, co-pending U.S. Patent application Ser. No. 14/285,905, entitled "Depth Key Compositing for Video and Holographic Projection" filed on May 23, 2014 by Crowder et al. (the contents of which incorporated by reference herein in its entirety), special depth-based camera arrangements may be used to isolate objects from captured visual images, which may then be used to generate a visual display that shows only those isolated objects as a holographic projection. Other techniques may be used to create holographic projection images, however, and the technique mentioned above is merely one example.

Moreover, while there have been shown and described illustrative embodiments, it is to be understood that various other adaptations and modifications may be made within the spirit and scope of the embodiments herein. For example, while the embodiments have been described in terms of video panels, still pictures (stationary images) may also benefit from the techniques herein, and any reference to "video" or "image" or "picture" need not limit the embodiments to whether they are motion or time-sequence photography or still images, etc.

Note also that any two-dimensional holographic imagery techniques may be used herein, and the illustrations provided above are merely example embodiments. Three-dimensional holographic images may also be used, but require multiple camera angles, multiple respective depth ranges, and greater data processing.

Further, the embodiments herein may generally be performed in connection with one or more computing devices (e.g., personal computers, laptops, servers, specifically configured computers, cloud-based computing devices, cameras, etc.), which may be interconnected via various local and/or network connections. Various actions described herein may be related specifically to one or more of the devices, though any reference to particular type of device herein is not meant to limit the scope of the embodiments herein.

The foregoing description has been directed to specific embodiments. It will be apparent, however, that other variations and modifications may be made to the described embodiments, with the attainment of some or all of their advantages. For instance, it is expressly contemplated that certain components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. An apparatus, comprising:
an image source configured to project a source image;
a screen located at an angle relative to the image source configured to direct the source image from the image source as a holographic projection in a viewing direction towards a viewer; and
a physical optical illusion background creating an illusion of depth behind the screen and the holographic projection, wherein the screen is located between the viewer and the background, and
wherein the optical illusion background produces a depth perception that gives an appearance of depth behind the holographic projection.

2. The apparatus as in claim 1, wherein the background displays a geometric pattern to create the illusion of depth.

3. The apparatus as in claim 1, wherein the background displays a perspective-based image to create the illusion of depth.

4. The apparatus as in claim 1, wherein the background displays a picture to create the illusion of depth.

5. The apparatus as in claim 4, wherein the picture depicts scenery with perspective.

6. The apparatus as in claim 1, wherein the screen and background are configured for positioning at opposing ends of a stage.

7. The apparatus as in claim 1, wherein the image source comprises a panel display.

8. The apparatus as in claim 1, wherein the image source comprises:
a projector; and
a projection bounce disposed on a visual path between the projector and the screen, wherein the projection bounce reflects the source image from the projector towards the screen.

9. The apparatus as in claim 1, wherein the screen comprises a tensioned foil.

10. The apparatus as in claim 1, wherein the screen comprises a rigid material.

11. The apparatus as in claim 1, wherein the optical illusion background displays a static illusion of depth.

12. The apparatus as in claim 1, wherein the optical illusion background displays a dynamic illusion of depth.

13. The apparatus as in claim 1, wherein the optical illusion background is selected from a group consisting of: a static optical illusion image; a panel display configured to display an optical illusion image; a projection screen configured to display an optical illusion image; and a projection mapping of an optical illusion image on a background environment.

14. A method, comprising:
providing an image source configured to project a source image;

arranging a screen at an angle relative to the image source configured to direct the source image from the image source as a holographic projection in a viewing direction towards a viewer; and creating, by a physical optical illusion background, an illusion of depth behind the screen and the holographic projection, wherein the screen is located between the viewer and the background, and wherein the optical illusion background produces a depth perception that gives an appearance of depth behind the holographic projection.

15. The method as in claim 14, wherein the background is configured to display at least one of: a geometric pattern to create the illusion of depth, a perspective-based image to create the illusion of depth, or a picture with scenery to create the illusion of depth.

16. The method as in claim 14, wherein the image source comprises a panel display.

17. The method as in claim 14, wherein the image source comprises:
  a projector; and
  a projection bounce disposed on a visual path between the projector and the screen, wherein the projection bounce reflects the source image from the projector towards the screen.

18. The method as in claim 14, wherein the screen comprises a tensioned foil or a rigid material.

19. The method as in claim 14, wherein the optical illusion background displays a static illusion of depth.

20. The method as in claim 14, wherein the optical illusion background displays a dynamic illusion of depth.

* * * * *